(12) United States Patent
Wang et al.

(10) Patent No.: US 12,189,029 B2
(45) Date of Patent: Jan. 7, 2025

(54) OPTICAL SENSING SYSTEM

(71) Applicant: PixArt Imaging Inc., Hsin-Chu (TW)

(72) Inventors: Guo-Zhen Wang, Hsin-Chu (TW);
Tse-En Peng, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/613,142

(22) Filed: Mar. 22, 2024

(65) Prior Publication Data

US 2024/0230896 A1 Jul. 11, 2024

Related U.S. Application Data

(63) Continuation of application No. 18/201,731, filed on May 24, 2023, now Pat. No. 11,971,480, which is a continuation of application No. 16/561,001, filed on Sep. 4, 2019, now Pat. No. 11,698,457.

(51) Int. Cl.
*G01S 17/04* (2020.01)
*G01S 7/48* (2006.01)
*G01S 17/08* (2006.01)

(52) U.S. Cl.
CPC ............ *G01S 17/04* (2020.01); *G01S 7/4808* (2013.01); *G01S 17/08* (2013.01)

(58) Field of Classification Search
CPC .... G06F 3/0423; G06F 3/04186; G06F 3/017; G06F 3/0418; G06F 3/0426; G06F 3/0425; G06F 2203/04101; G01S 17/46; G01S 7/4808; G01S 17/86; G01S 17/08; G01S 17/87; G01S 17/04; G06T 7/11; G06T 7/136; G06T 7/248; G06T 7/246; G06T 7/521; G06T 7/155; G06T 2207/10048; G06T 2207/20036; G06T 2207/30241; G06T 2207/20092; G06V 40/20

See application file for complete search history.

(56) References Cited

U.S. PATENT DOCUMENTS

| 5,574,511 | A | 11/1996 | Yang |
| 6,028,672 | A | 2/2000 | Geng |
| 6,700,669 | B1 | 3/2004 | Geng |
| 8,854,433 | B1 | 10/2014 | Rafii |
| 10,126,820 | B1* | 11/2018 | Chang ..................... G06F 3/017 |
| 2002/0041327 | A1* | 4/2002 | Hildreth .................. G06F 3/017 |
| | | | 348/E13.016 |

(Continued)

FOREIGN PATENT DOCUMENTS

| CN | 101902570 A | 12/2010 |
| CN | 102334086 A | 1/2012 |

(Continued)

*Primary Examiner* — Mouloucoulaye Inoussa
(74) *Attorney, Agent, or Firm* — Winston Hsu

(57) ABSTRACT

An optical sensing system, comprising: a first light source, configured to emit first light to a first position; a second light source, configured to emit second light to a second position, wherein the first position is above the second position, wherein the first light is not emitted to the second position and the second light is not emitted to the first position; and an optical sensor, configured to sense optical data generated based on at least one of the first light source and the second light source; wherein a detecting region of the optical sensor comprises an upper half region and a lower half region, wherein a size of the upper half region is adjustable.

11 Claims, 8 Drawing Sheets

(56) References Cited

U.S. PATENT DOCUMENTS

| | | |
|---|---|---|
| 2009/0058833 A1 | 3/2009 | Newton |
| 2009/0103780 A1 | 4/2009 | Nishihara |
| 2009/0116742 A1 | 5/2009 | Nishihara |
| 2011/0001799 A1 | 1/2011 | Rothenberger |
| 2011/0205151 A1 | 8/2011 | Newton |
| 2011/0296353 A1 | 12/2011 | Ahmed |
| 2012/0194479 A1 | 8/2012 | Stark |
| 2013/0182902 A1 | 7/2013 | Holz |
| 2013/0257736 A1* | 10/2013 | Hou ..................... G06F 3/0304 |
| | | 345/156 |
| 2013/0265218 A1 | 10/2013 | Moscarillo |
| 2014/0125813 A1 | 5/2014 | Holz |
| 2014/0225826 A1 | 8/2014 | Juni |
| 2014/0253512 A1 | 9/2014 | Narikawa |
| 2014/0369558 A1* | 12/2014 | Holz ..................... G06T 7/586 |
| | | 382/103 |
| 2015/0062003 A1 | 3/2015 | Rafii |
| 2015/0062004 A1 | 3/2015 | Rafii |
| 2016/0205306 A1 | 7/2016 | Wang |
| 2016/0234365 A1 | 8/2016 | Alameh |
| 2016/0309134 A1 | 10/2016 | Venkataraman |
| 2018/0032210 A1 | 2/2018 | Cutu |
| 2018/0180716 A1 | 6/2018 | McVittie |

FOREIGN PATENT DOCUMENTS

| | | |
|---|---|---|
| CN | 102968218 A | 3/2013 |
| CN | 105122081 A | 12/2015 |
| CN | 107424186 A | 12/2017 |
| CN | 110031002 A | 7/2019 |
| EP | 3 301 477 A1 | 4/2018 |
| JP | 2011-215100 A | 10/2011 |
| TW | 201128488 A1 | 8/2011 |

\* cited by examiner

OPTICAL SENSING SYSTEM

CROSS REFERENCE TO RELATED APPLICATIONS

This application is a continuation application of U.S. application Ser. No. 18/201,731, filed on May 24, 2023, which is a continuation application of U.S. application Ser. No. 16/561,001, filed on Sep. 4, 2019. The contents of these applications are incorporated herein by reference.

BACKGROUND OF THE INVENTION

1. Field of the Invention

The present invention relates to an optical sensing system, and particularly relates to an optical sensing system which can reduce the effect that the arm causes for hand location calculating.

2. Description of the Prior Art

With the progress of science and technology, an electronic device which can be controlled by a hand becomes more and more popular. Such electronic device can detect a location of a hand, and thus can be controlled via moving a hand. However, the location of the hand may be wrongly detected due to a user's posture.

FIG. 1 is a schematic diagram illustrating a conventional hand detecting method. The user's hand is supposed to move in a detecting region DR which comprises six sub-regions R1-R6. The location of a hand is determined by a centroid of a hand image HI. However, a location of the calculated centroid may be different from a real centroid of the hand image HI. The size and the location of the detecting region DR can be determined by, for example, a sensing ability or a location of an image sensor, or locations of light sources.

As illustrated in FIG. 1, if the user's hand is in an upper part of the detecting region DR, the hand image HI_1 is also in an upper part and a real centroid RC_1 of the hand image HI means a location of the hand. However, besides the hand image HI_1, the image sensed by the image sensor may further comprise the arm image AI_1; thus the calculated centroid CC_1 is below the real centroid RC_1. Accordingly, the detected location of the hand is a location of the calculated centroid CC_1 rather than a location of the real centroid RC_1. Following the same rule, if the hand is in a middle part of the detecting region DR, the detected location of the hand is a location of the calculated centroid CC_2 rather than a location of the real centroid RC_2. Also, if the user's hand is in a lower part of the detecting region DR, a location of the calculated centroid CC_3 is substantially the same as a real centroid of the hand, since no arm image is captured.

In view of above-mentioned descriptions, essential areas of upper detecting regions such as the sub-regions R1-R3 are reduced since the calculated centroids are always lower than the real centroids. Therefore, the users may feel the inconvenience for controlling the electronic device by their hands when the hands are in an upper half region of the detecting region DR. Also, different sub-regions may mean different functions; thus the user may trigger an undesired function in a conventional method.

SUMMARY OF THE INVENTION

Therefore, one objective of the present invention is to provide an optical sensing system which can reduce the effect that the arm causes for hand location calculating.

One embodiment of the present invention discloses an optical sensing system, comprising: a first light source, configured to emit first light to a first position; a second light source, configured to emit second light to a second position, wherein the first position is above the second position, wherein the first light is not emitted to the second position and the second light is not emitted to the first position; and an optical sensor, configured to sense optical data generated based on at least one of the first light source and the second light source; wherein a detecting region of the optical sensor comprises an upper half region and a lower half region, wherein a size of the upper half region is adjustable.

In view of above-mentioned embodiments, the effect that the arm causes for hand location calculating can be reduced since the detecting region is adjusted corresponding to a size of a portion of the arm which can be sensed.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note, the components in each embodiment can be implemented by hardware (e.g. device, circuit . . . ) or hardware with software (e.g. a processor installed with at least one program). Also, the terms "first", "second" . . . in following descriptions are only for defining different components and do not mean the sequences thereof. Furthermore, the term "hand" in following descriptions may mean "a palm" or "fingers with a palm".

Figure 2:
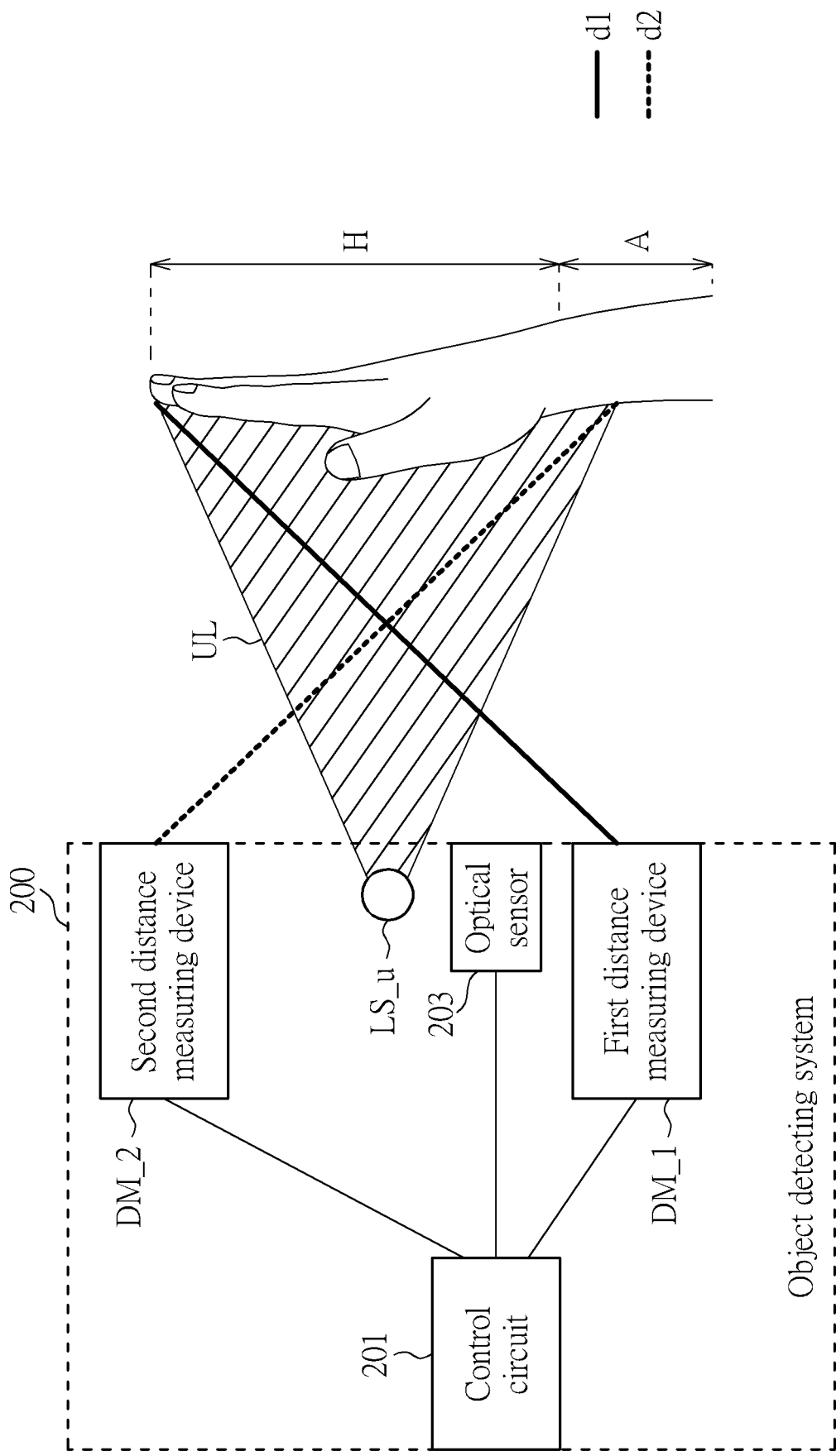
FIG. 2 is a block diagram illustrating an object detecting system according to one embodiment of the present invention.

FIG. 2 is a block diagram illustrating an object detecting system 200 according to one embodiment of the present invention. As illustrated in FIG. 2, the object detecting system 200 comprises a first distance measuring device DM_1, a second distance measuring device DM_2, a control circuit 201, an optical sensor 203, and a uniform light source LS_u. The first distance measuring device DM_1 is configured to detect a first distance d1 between a hand H and the first distance measuring device DM_1. The second distance measuring device DM_2 is configured to detect a second distance d2 between an arm A and the second distance measuring device DM_2. Please note, in the embodiment of FIG. 2, the first distance measuring device DM_1 is located below the second distance measuring device DM_2 to measure the first distance d1 of the hand H above the arm A, and the second distance measuring device DM_2 is located above the second distance measuring device DM_2 to measure the arm A below the hand H. However, in one embodiment, the locations of the first distance measuring device DM_1 and the second distance measuring device DM_2 can be swapped, corresponding to the measuring algorithms thereof.

The uniform light source LS_u is configured to emit uniform light UL to the hand H and the arm A. Further, the optical sensor 203 is configured to receive optical data (e.g. image or reflected light) of the hand H and the arm A, which is generated based on the uniform light UL. Additionally, the control circuit 201 is configured to calculate a location of the hand H according to the first distance d1, the second distance d2 and the optical data.

Please note, in the embodiment of FIG. 2, the first distance measuring device DM_1 and the second distance measuring device DM_2 are applied to measure distances for the hand H and the arm A. However, the object detecting system 200 can be applied to any object besides the hand H and the arm A. In such case, the first distance measuring device DM_1 can be applied to measure a first distance between the first part of an object and the first distance measuring device DM_1, and the second distance measuring device DM_2 can be applied to measure a second distance between a second part of the object and the second distance measuring device DM_2.

In one embodiment, the object detecting system 200 can detect the hand H and the arm A in a detecting region. That is, users are supposed to use their hands to control the electronic device in this detecting region. The detecting region comprises an upper half region and a lower half region, and the control circuit 201 adjusts a size the upper half region according to the first distance d1 and the second distance d2.

Figure 1:
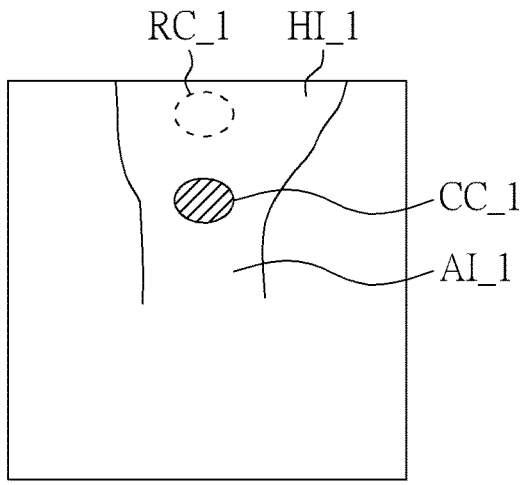
FIG. 1 is a schematic diagram illustrating a conventional hand detecting method.
Figure 1:
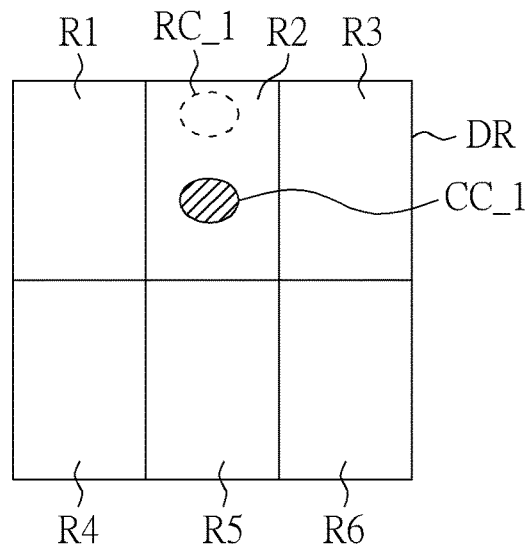
Figure 1:
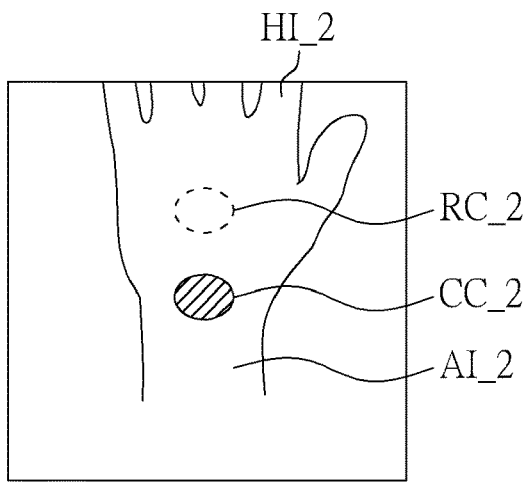
Figure 1:
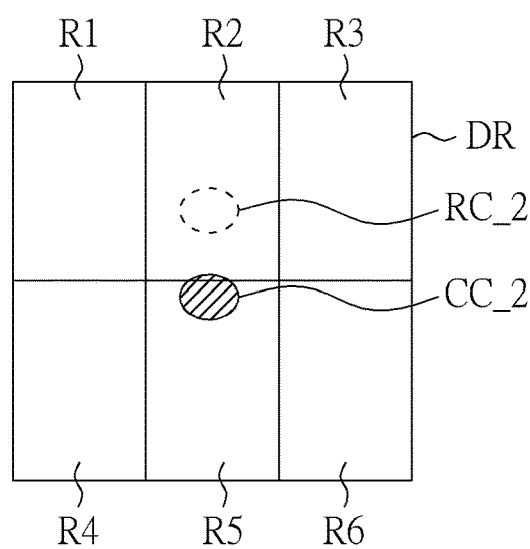
Figure 1:
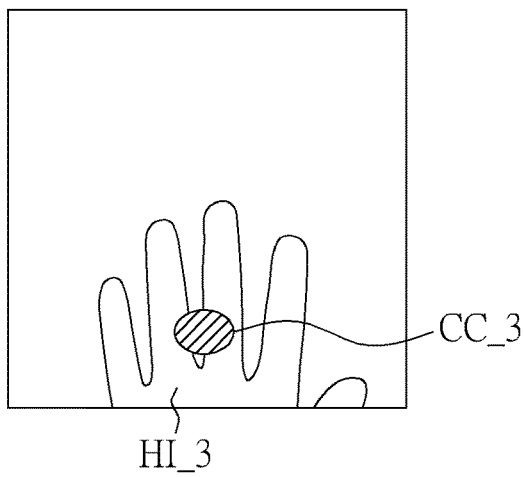
Figure 1:
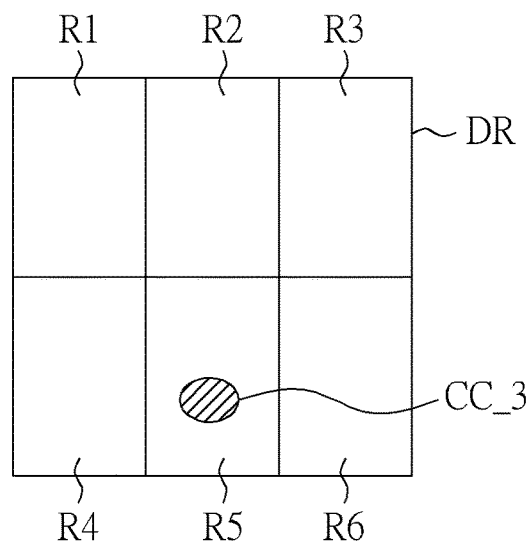
Figure 3:
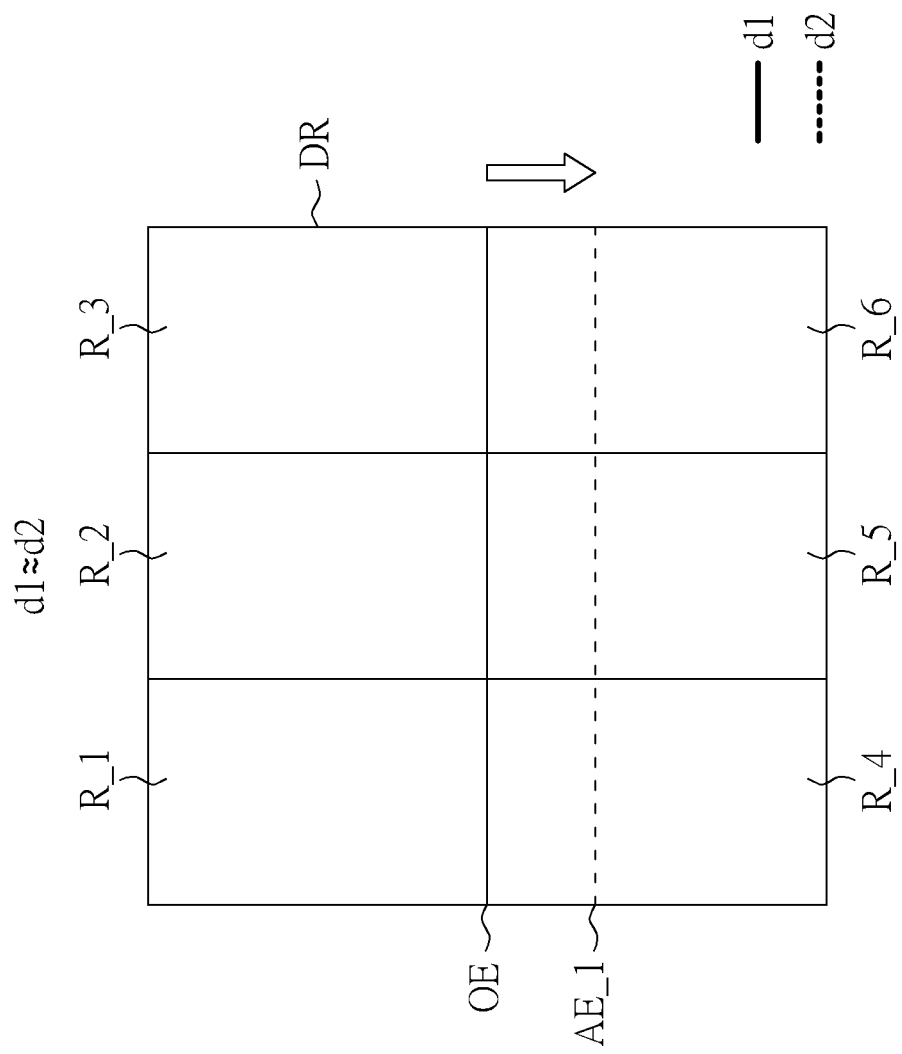
FIG. 3 and FIG. 4 are schematic diagrams illustrating examples of adjusting detecting regions.
Figure 3:
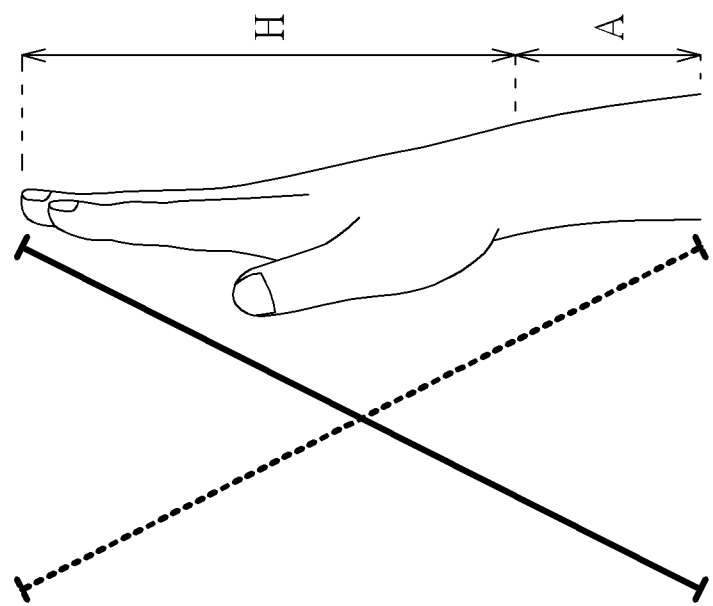
Figure 4:
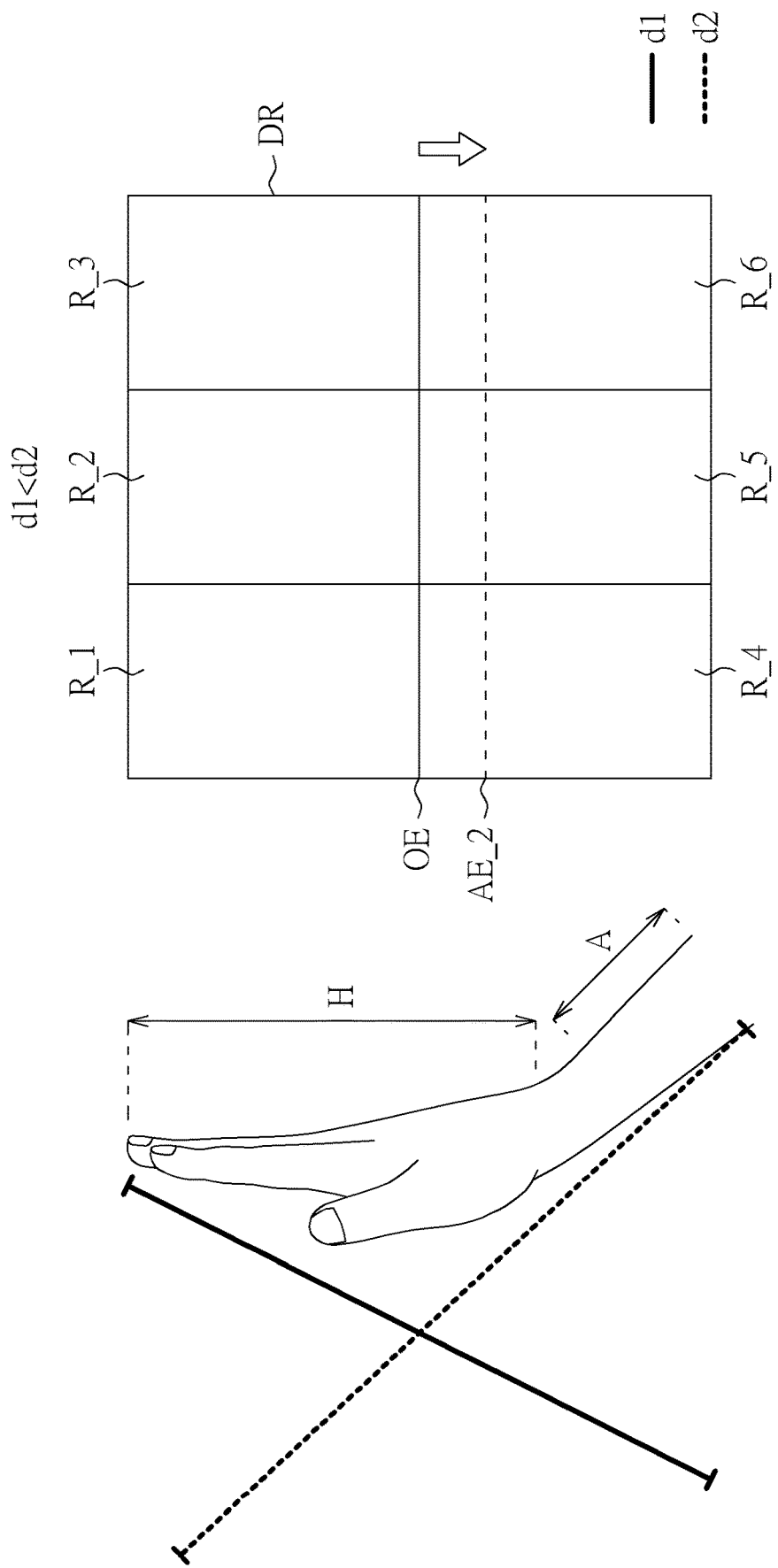

FIG. 3 and FIG. 4 are schematic diagrams illustrating examples of adjusting detecting regions. In these examples, the upper half region means the sub-regions R_1, R_2 and R_3, and the lower half region means the sub-regions R_4, R_5 and R_6. In the example of FIG. 3, a distance difference between the first distance d1 and the second distance d2 is smaller than a distance threshold. That is, the first distance d1 substantially equals to the second distance d2. In such case, the hand H and the arm A are almost in a line, thus the optical data of a large portion of the arm A may be sensed by the optical sensor 203. Accordingly, the calculated centroid may be far below the real centroid, as illustrated in FIG. 1. Therefore, in such case, the control circuit 201 increases the size of the upper half region to a first size. In other words, the control circuit 201 pulls down the original edge OE of the upper half region to a location of the adjusted edge AE_1.

In the example of FIG. 4, the first distance d1 is smaller than the second distance d2 for more than the distance threshold. That is, the first distance d1 is substantially smaller than the second distance d2. In such case, the arm A is tilted so there is an angle between the hand H and the arm A; thus the optical data of a smaller portion of the arm A may be sensed by the optical sensor 203. Accordingly, the calculated centroid may be still below the real centroid but is closer than the example in FIG. 3. Therefore, in such case, the control circuit 201 increases the size of the upper half region to a second size smaller than the first size in FIG. 3. In other words, the control circuit 201 pulls down the original edge OE of the upper half region to a location of the adjusted edge AE_2, which is above the adjusted edge AE_1 in FIG. 3.

Since the detecting regions in the examples of FIG. 3 and FIG. 4 are adjusted corresponding to the first distance d1 and the second distance d2, effect of the arm A can be reduced. In other words, the upper half region of the detecting region DR is extended following a direction of the arm A, and the extending level corresponding to a size of the arm A which can be detected by the optical sensor 201. Thereby the hand H can still be determined to operate in the upper half region even if the calculated centroid is located in an original lower half region.

Figure 5:
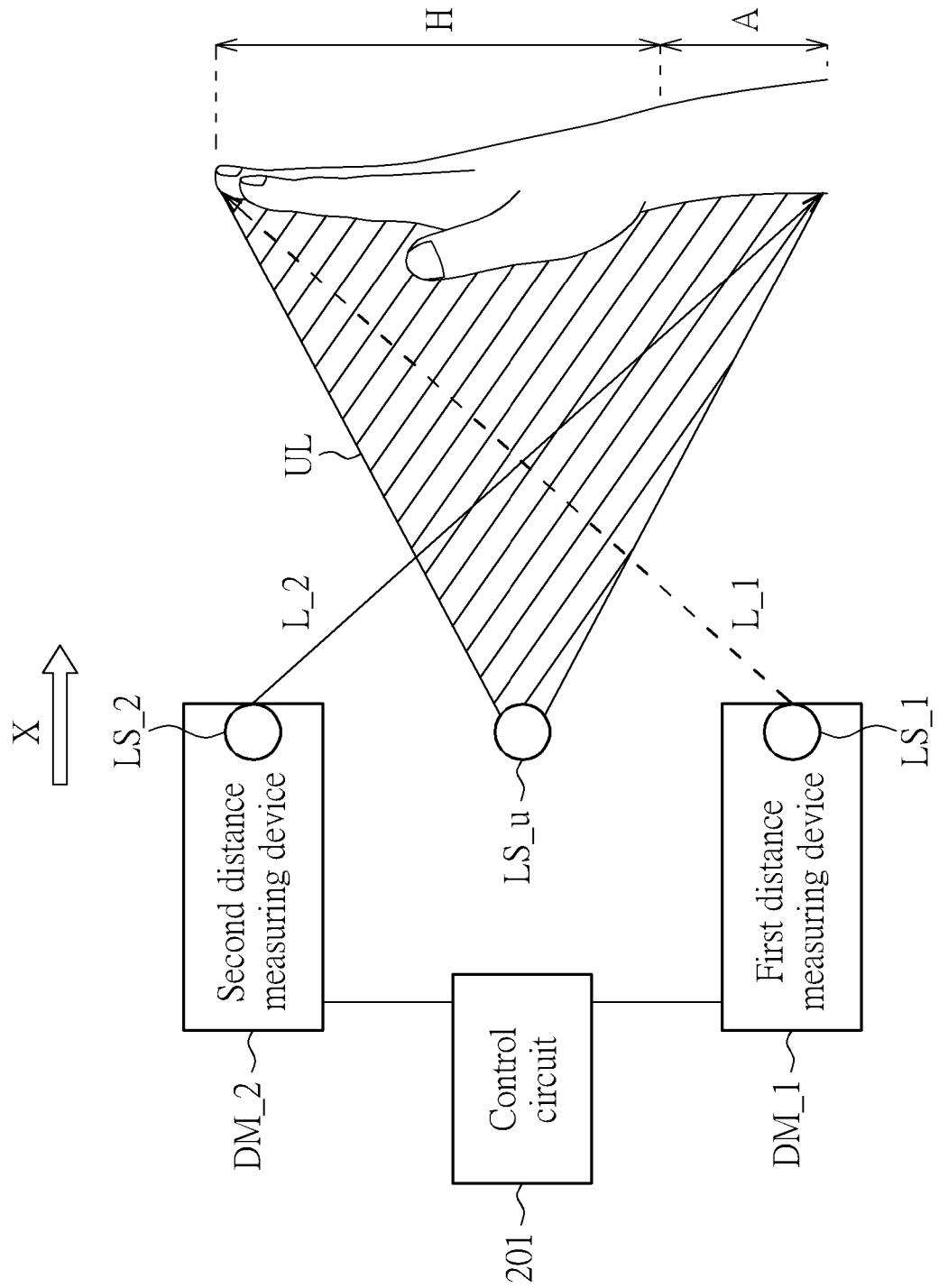
FIG. 5 is a schematic diagram illustrating an example for the first distance measuring device and the second distance measuring device illustrated in FIG. 2.

The above-mentioned first distance measuring device DM_1 and the second distance measuring device DM_2 can comprise various structures. FIG. 5 is a schematic diagram illustrating an example for the first distance measuring device and the second distance measuring device illustrated in FIG. 2. Please note, for the convenience of understanding, some components are not illustrated in FIG. 5. In the embodiment of FIG. 5, the first distance measuring device DM_1 comprises a first light source LS_1 can emit first light L_1 which is dot light or line light. Also, the second distance measuring device DM_2 comprises a second light source LS_2 can emit second light L_2 which is dot light or line light. The first distance measuring device DM_1 calculates the first distance d1 based on the first light L_1, and the second distance measuring device DM_2 calculates the second distance d2 based on the second light L_2.

In the embedment of FIG. 5, the first distance measuring device DM_1 and the second distance measuring device DM_2 use triangulation distance measurement; thus the arrangement of the first distance measuring device DM_1 and the second distance measuring device DM_2 is opposite to the hand H and the arm A. However, if the first distance measuring device DM_1 and the second distance measuring device DM_2 use other distance measuring methods such as TOF (time of flight), the locations of the first distance measuring device DM_1 and the second distance measuring device DM_2 can be swapped. In the embodiment of FIG. 5, the distance calculating can performed by the control circuit 201 or by control circuits in the first distance measuring device DM_1 and the second distance measuring device DM_2.

Figure 6:
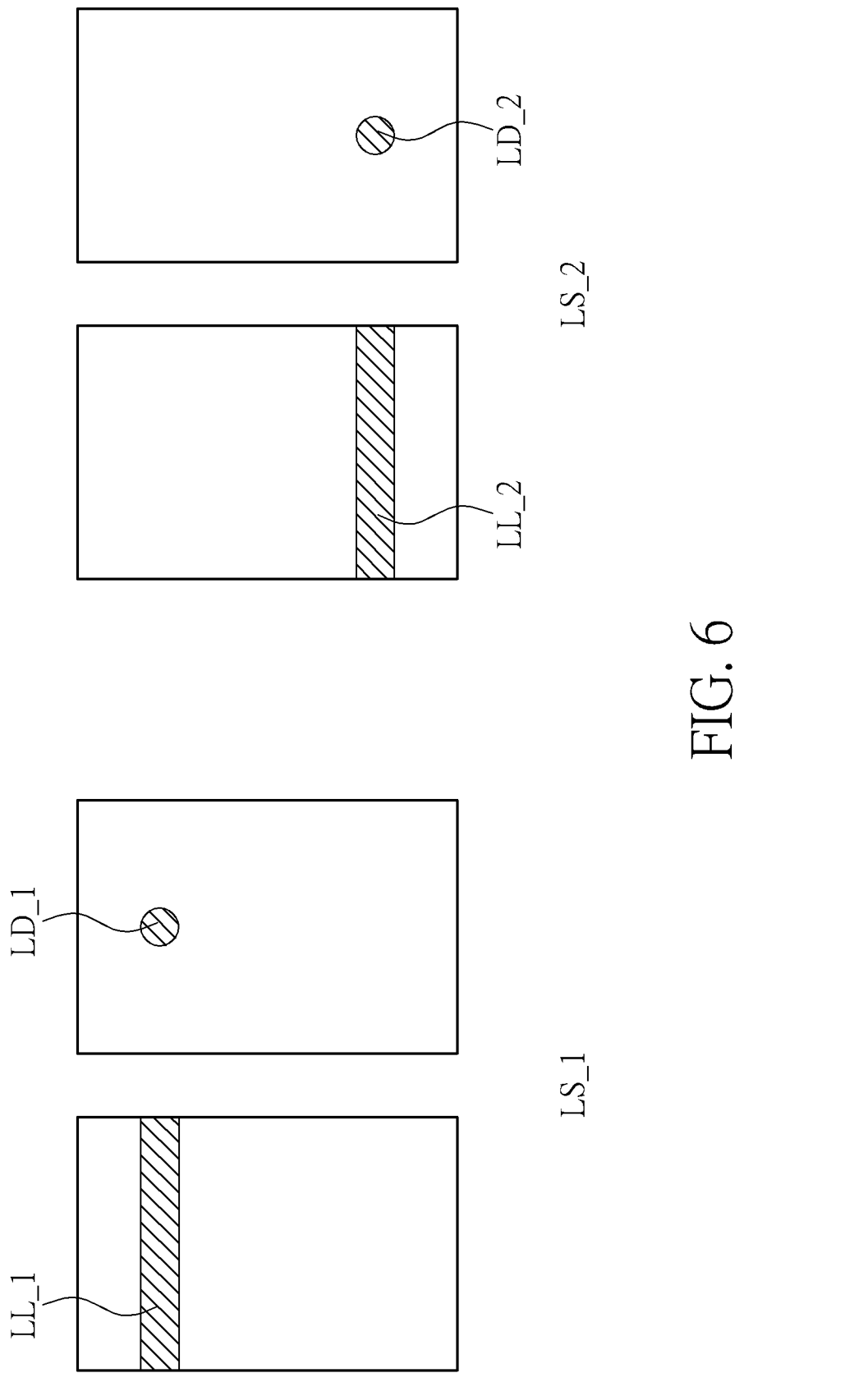
FIG. 6 is a schematic diagram illustrating the first light and the second light are line light or dot light.

As above mentioned, the first light L_1 and the second light L_2 can be line light or dot light. FIG. 6 is a schematic diagram illustrating the first light and the second light are line light or dot light, which follows a view in X direction in FIG. 5. As illustrated in FIG. 6, the line light LL_1 and LL_2 are respectively the light from the first light source LS_1 and the second light source LS_2 when they are line light sources. Also, the dot light LD_1 and LD_2 are respectively the light from the first light source LS_1 and the second light source LS_2 when they are dot light sources. Via FIG. 6, it can be clearly understood that how the first light source LS_1 and the second light source LS_2 emit the light to the hand H or the arm A.

Figure 7:
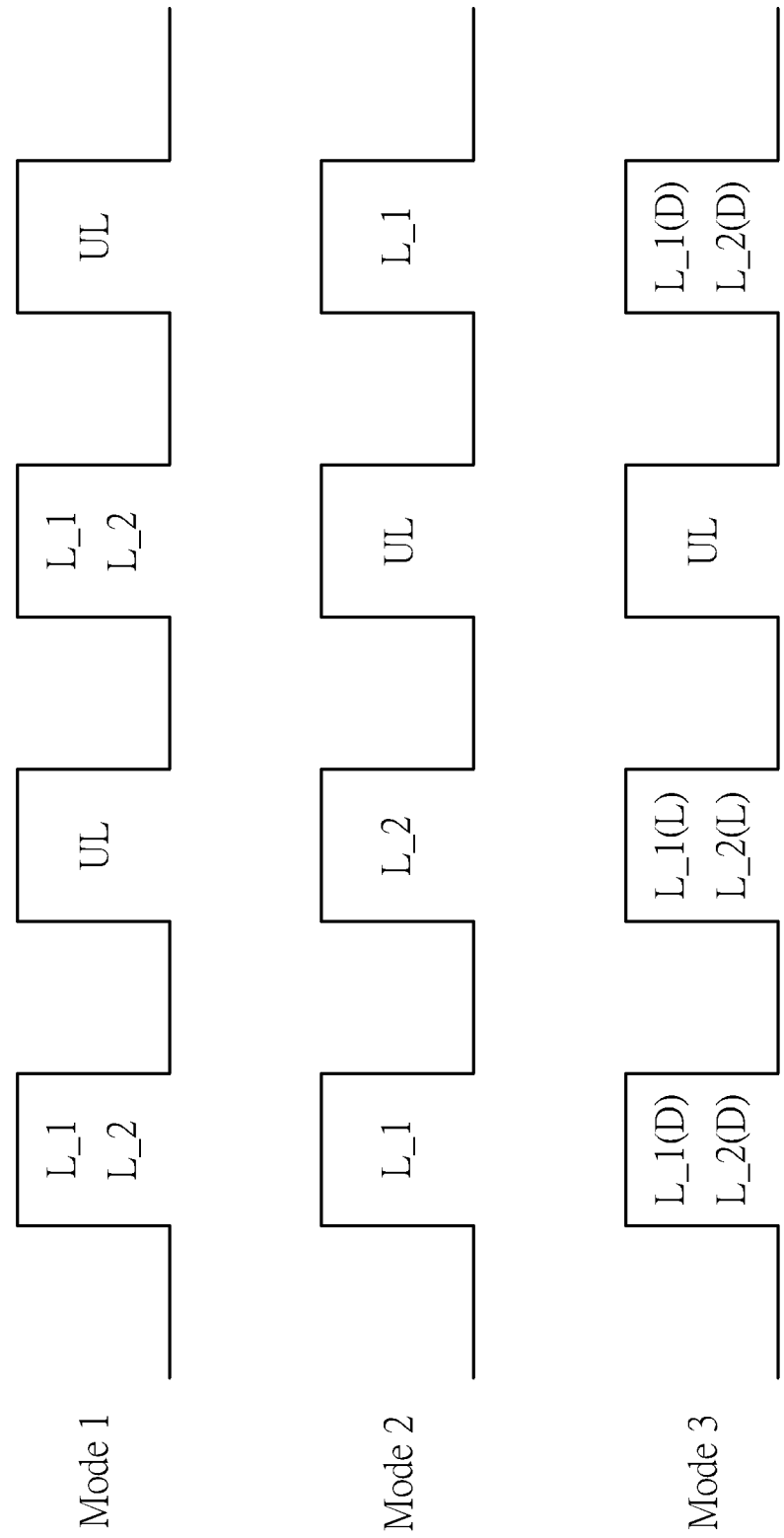
FIG. 7 is a schematic diagram illustrating different modes of the first light source and the second light source, according to one embodiment of the present invention.

The first light source LS_1, the second light source LS_2 and the uniform light source LS_u in FIG. 5 can operate in different modes. In at least one mode, the uniform light source LS_u emits the uniform light UL after the first light source LS_1 emits the first light L_1 for a predetermined time or after the second light source LS_2 emits the second light L_2 for the predetermined time. As shown in FIG. 7, in Mode 1, after the first light L_1 and the second light L_2 are emitted for a predetermined time, the uniform light UL is emitted. Further, in Mode 2, the second light L_2 is emitted after the first light L_1 is emitted for a predetermined time, and the uniform light UL is emitted after the second light L_2 is emitted for a predetermined time. Via the Mode 1 and the Mode 2, the first light L_1, the second light L_2 and the uniform light UL are not simultaneously emitted. Thus the operations of measuring distance and calculating location of the hand H are not interfered by non-necessary light.

Additionally, in Mode 3, the first light source LS_1 emits the dot light as the first light L_1(D) and the second light source LS_2 emits the dot light as the second light L_2(D) when the control circuit 201 does not detect existence of the hand H or the arm A. After the control circuit 201 detects the existence of the hand H or the arm A, the first light source LS_1 emits the line light as the first light L_1(L) and the second light source LS_2 emits the line light as the second light L_2(L). Since the dot light consumes less power and the line light is more helpful for measuring the distance, the first distance measuring device DM_1 and the second distance measuring device DM_2 can still correctly measure the distances while consuming less power. Many methods can be applied to detect the existence of the hand H or the arm A. For example, if the optical sensor 203 receives more reflected light, the control circuit 201 detects the hand H or the arm A is approaching.

Figure 8:
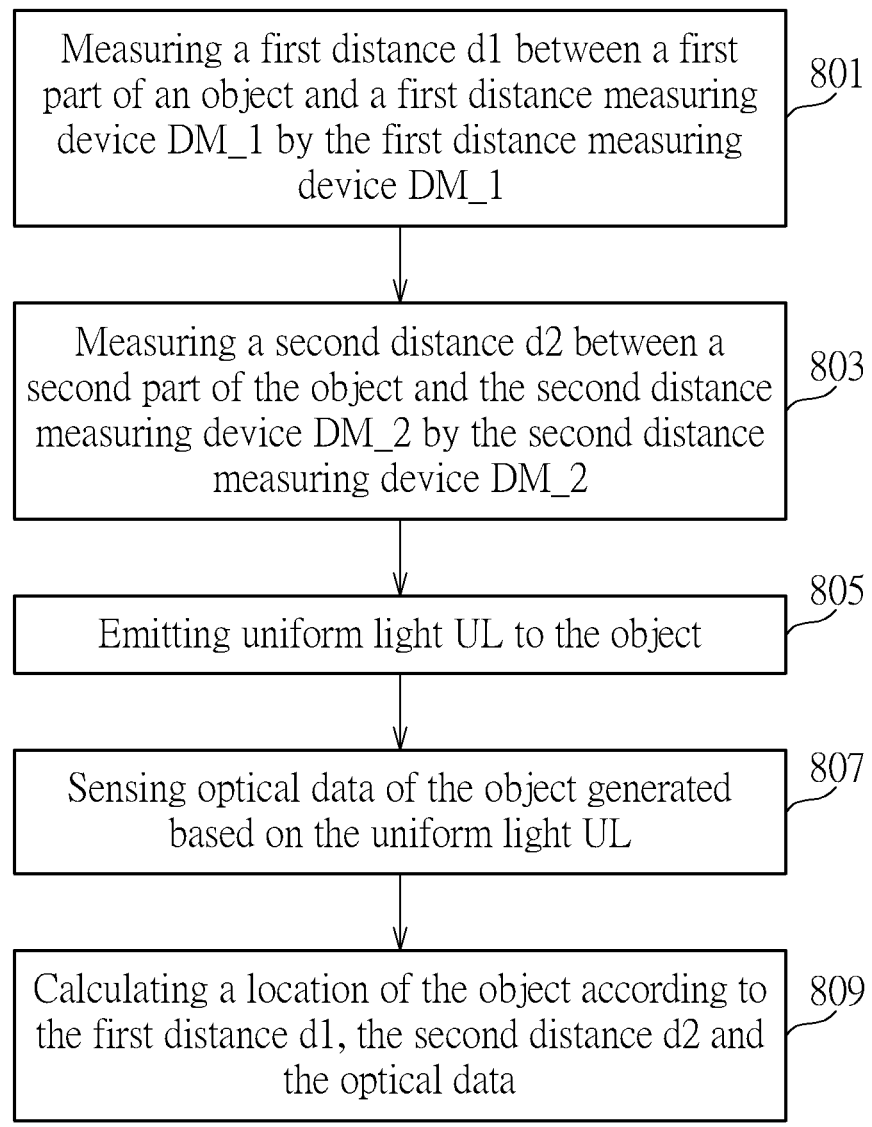
FIG. 8 is a flow chart illustrating an object detecting method according to one embodiment of the present invention.

In view of above-mentioned embodiments, an object detecting method can be acquired, which comprises following steps illustrated in FIG. 8.

Step 801

Measuring a first distance d1 between a first part (e.g. a hand H) of an object and a first distance measuring device DM_1 by the first distance measuring device DM_1.

Step 803

Measuring a second distance d2 between a second part (e.g. an arm A) of the object and the second distance measuring device DM_2 by the second distance measuring device DM_2.

Step 805

Emitting uniform light UL to the object.

Step 807

Sensing optical data of the object generated based on the uniform light UL.

Step 809

Calculating a location of the object according to the first distance d1, the second distance d2 and the optical data.

In view of above-mentioned embodiments, the effect that the arm causes for hand location calculating can be reduced since the detecting region is adjusted corresponding to a size of a portion of the arm which can be sensed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensing system, comprising:
   a first light source, configured to emit first light to a first position;
   a second light source, configured to emit second light to a second position, wherein the first position is above the second position, wherein the first light is not emitted to the second position and the second light is not emitted to the first position; and
   an optical sensor, configured to sense optical data generated based on at least one of the first light source and the second light source;
   wherein a detecting region of the optical sensor comprises an upper half region and a lower half region, wherein a size of the upper half region is adjustable.

2. The optical sensing system of claim 1, wherein the first light is dot light.

3. The optical sensing system of claim 1, wherein the first light is line light.

4. The optical sensing system of claim 1, wherein the second light is dot light.

5. The optical sensing system of claim 1, wherein the second light is line light.

6. The optical sensing system of claim 1, wherein the second light source emits the second light after the first light source emits the first light for a predetermined time.

7. The optical sensing system of claim 6, further comprising:
   a uniform light source, configured to emit uniform light to the object, wherein the first light source is below the uniform light source and the second light source is above the uniform light source;
   wherein the uniform light source emits the uniform light after the second light source emits the second light for the predetermined time.

8. The optical sensing system of claim 1, further comprising:
   a uniform light source, configured to emit uniform light to the object, wherein the first light source is below the uniform light source and the second light source is above the uniform light source.

9. The optical sensing system of claim 8, wherein the first light, the second light and the uniform light are not simultaneously emitted.

10. The optical sensing system of claim 8, wherein the uniform light source emits the uniform light after the first light source emits the first light for a predetermined time or the second light source emits the second light for the predetermined time.

11. The optical sensing system of claim 1, wherein the object is a hand.

* * * * *